(12) United States Patent
Kim et al.

(10) Patent No.: US 11,870,266 B2
(45) Date of Patent: Jan. 9, 2024

(54) PHOTOVOLTAIC POWER GENERATION SYSTEM

(71) Applicant: LG INNOTEK CO., LTD., Seoul (KR)

(72) Inventors: Soo San Kim, Seoul (KR); Seung Min Lee, Seoul (KR); Jae Yeop Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 72 days.

(21) Appl. No.: 17/789,238

(22) PCT Filed: Nov. 25, 2020

(86) PCT No.: PCT/KR2020/016783
§ 371 (c)(1),
(2) Date: Jun. 27, 2022

(87) PCT Pub. No.: WO2021/141238
PCT Pub. Date: Jul. 15, 2021

(65) Prior Publication Data
US 2023/0031025 A1    Feb. 2, 2023

(30) Foreign Application Priority Data

Jan. 6, 2020 (KR) ......................... 10-2020-0001430

(51) Int. Cl.
*H02J 3/38* (2006.01)
*H02M 1/00* (2006.01)
(Continued)

(52) U.S. Cl.
CPC .............. *H02J 3/381* (2013.01); *H02J 7/345* (2013.01); *H02J 7/35* (2013.01); *H02M 1/0067* (2021.05);
(Continued)

(58) Field of Classification Search
CPC .... H02J 3/38; H02J 3/381; H02J 7/345; H02J 7/35; H02J 2207/20; H02J 2300/26; H02M 1/0067; H02M 1/15; H02S 10/00
See application file for complete search history.

(56) References Cited

U.S. PATENT DOCUMENTS

2019/0157865 A1    5/2019   Khaitan et al.

FOREIGN PATENT DOCUMENTS

JP          2012-44066 A      3/2012
KR      10-2011-0029730 A    3/2011
(Continued)

*Primary Examiner* — Robert L Deberadinis
(74) *Attorney, Agent, or Firm* — Birch, Stewart, Kolasch & Birch, LLP

(57) ABSTRACT

A photovoltaic power generation system according to an embodiment of the present invention comprises: a first converter for converting and outputting power applied from a photovoltaic power generation panel; a second converter for receiving, via a first input/output terminal, the power output by the first converter, converting same, and outputting same via a second input/output terminal, or receiving power from the second input/output terminal, converting same, and outputting same via the first input/output terminal; a third converter for receiving power from the first converter or the second converter and charging an energy storage device, or transmitting power charged in the energy storage device to the second converter; and an active power filter for reducing ripples in the second converter, wherein power stored in the active power filter is transmitted to the first converter.

20 Claims, 5 Drawing Sheets

(51) Int. Cl.
*H02J 7/34* (2006.01)
*H02J 7/35* (2006.01)
*H02M 1/15* (2006.01)
*H02S 10/00* (2014.01)

(52) U.S. Cl.
CPC ............... *H02M 1/15* (2013.01); *H02S 10/00* (2013.01); *H02J 2207/20* (2020.01); *H02J 2300/26* (2020.01)

(56) References Cited

FOREIGN PATENT DOCUMENTS

| KR | 10-2016-0129266 A | 11/2016 |
| KR | 10-2019-0036914 A | 4/2019 |

PHOTOVOLTAIC POWER GENERATION SYSTEM

CROSS REFERENCE TO RELATED APPLICATIONS

This application is the National Phase of PCT/KR2020/016783 filed on Nov. 25, 2020, which claims priority under 35 U.S.C. § 119(a) to Patent Application No. 10-2020-0001430 filed in the Republic of Korea on Jan. 6, 2020, all of which are hereby expressly incorporated by reference into the present application.

TECHNICAL FIELD

The present invention relates to a photovoltaic power generation system, and more particularly, to a photovoltaic power generation system for reducing ripples by regenerating the energy of an active power filter.

BACKGROUND ART

Photovoltaic power generation is an eco-friendly energy power generation method, and widely used to replace the existing chemical power generation or nuclear power generation. There are two types of solar power generation: a stand-alone type in which a battery is connected to the converter and a connected type being connected to the power system, and in general, stand-alone power generation comprises a solar cell, a storage battery, a power conversion device, and the like, and the power system-linked system is configured to exchange power with a load system line by being connected to a commercial power source.

A converter that converts AC to DC or DC to AC is required in order to exchange power with a load or power system; for long life, the electrolytic capacitor of the converter is replaced with a film capacitor, and a method in which the voltage ripples increased due to a decrease in capacity value are reduced using an active power filter (APF) is used. However, there is a problem in that when the input and output voltages of the APF exceed the limit voltage, the operation is stopped and the ripples cannot be reduced, thereby becoming unstable.

DETAILED DESCRIPTION OF THE INVENTION

Technical Subject

The technical problem to be solved by the present invention is to provide a photovoltaic power generation system and a bidirectional power conversion device for reducing the ripples by regenerating the energy of an active power filter.

The problems of the present invention are not limited to the problems mentioned above, and other problems not mentioned will be clearly understood by those skilled in the art from the following description.

Technical Solution

In order to solve the above technical problem, a photovoltaic power generation system according to an embodiment of the present invention comprises: a first converter for converting and outputting power applied from a photovoltaic power generation panel; a second converter for receiving, via a first input/output terminal, the power outputted by the first converter, converting same, and outputting same via a second input/output terminal, or receiving power from the second input/output terminal, converting same, and outputting same via the first input/output terminal; a third converter for receiving power from the first converter or the second converter and charging an energy storage device, or transmitting power charged in the energy storage device to the second converter; and an active power filter for reducing the ripples in the second converter, wherein power stored in the active power filter is transmitted to the first converter.

In addition, the active power filter may include an energy storage device for storing power, and when the voltage of the energy storage device is equal to or greater than the threshold value, at least a portion of the power stored in the energy storage device may be transmitted to the first converter.

In addition, the active power filter may reduce the ripples generated when the second converter receives power from the second input/output terminal.

In addition, the active power filter may reduce the ripples of the second converter by transmitting and receiving power to and from the second converter and removing the AC component of power being outputted from the second converter.

In addition, it may include a transmission line for transmitting power from the active power filter to the first converter.

In addition, the power transmitted from the active power filter to the first converter may charge the energy storage device through the first converter and the third converter.

In addition, the first converter may control the photovoltaic power generation panel by using the maximum power point tracking.

In addition, the first converter and the third converter are DC-DC converters, and the second converter may be a bidirectional inverter or a bidirectional AC-DC converter.

In addition, it may include an energy storage device connecting the first converter, the second converter, and the third converter.

In order to solve the above technical problem, a bidirectional power conversion device according to another embodiment of the present invention comprises: a second converter for receiving, via a first input/output terminal, from the first converter or a third converter, converting same, and outputting same via a second input/output terminal, or receiving power from the second input/output terminal, converting same, and outputting same via the first input/output terminal; an active power filter for reducing the ripples generated when the second converter receives power from the second input/output terminal; an energy storage device for storing the power of the active power filter; and a transmission line for transmitting at least a portion of the power stored in the energy storage device to the energy storage unit when the voltage of the energy storage device is equal to or greater than the threshold value.

Advantageous Effects

According to embodiments of the present invention, an active power filter can stably reduce the ripples by regenerating energy greater than or equal to the storable energy of the active power filter. Through this, the battery can be charged without stopping the operation of the converter.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
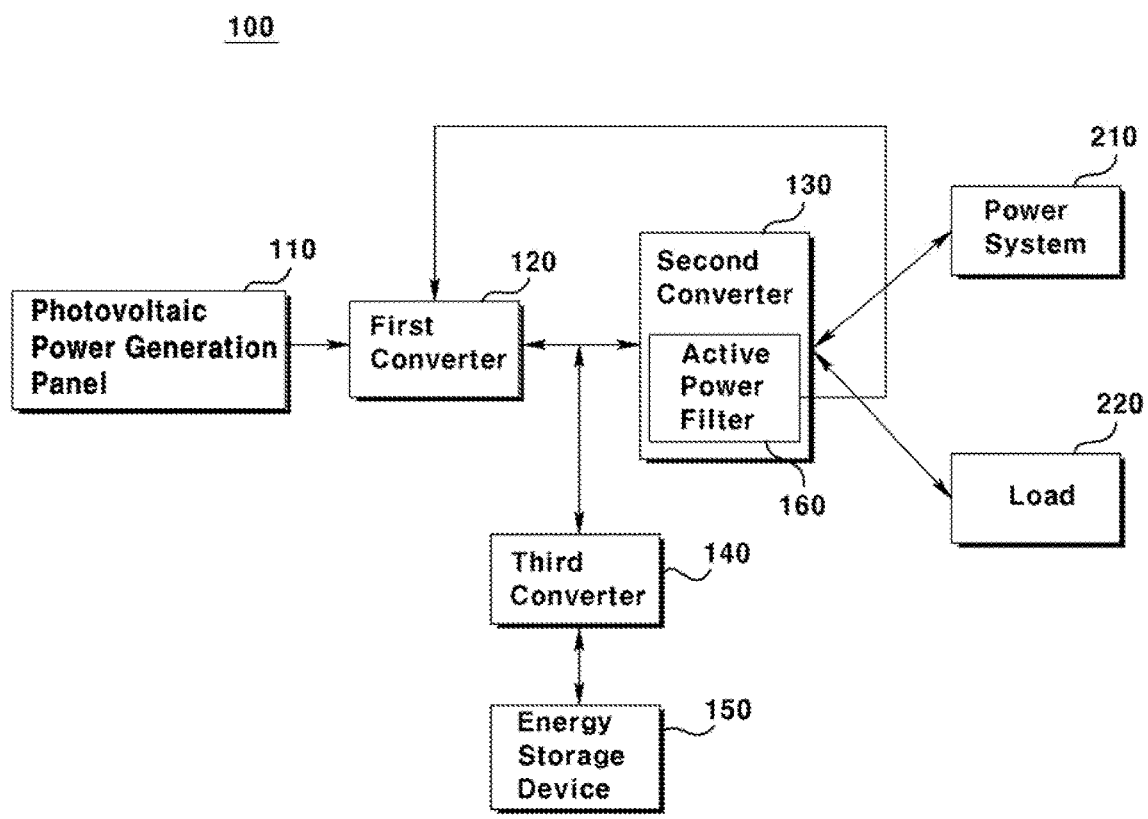
FIG. 1 is a block diagram of a photovoltaic power generation system according to an embodiment of the present invention.

FIG. 1 is a block diagram of a photovoltaic power generation system according to an embodiment of the present invention.

A photovoltaic power generation system 100 according to an embodiment of the present invention comprises a photovoltaic power generation panel 110, a first converter 120, a second converter 130, and a third converter 140, and an active power filter 160, and may further include an energy storage device 150.

The photovoltaic power generation panel 110 generates power using sunlight.

More specifically, the photovoltaic (PV) power generation panel 110 generates electric power using the photoelectric effect using sunlight. The photoelectric effect emits electrons when light of a specific frequency or more hits a specific metal material. A P-N junction is formed using a p-type semiconductor and an n-type semiconductor, and electric power is generated by using the electrons generated by the photoelectric effect to generate a current. The photovoltaic power generation panel 110 is formed using silicon or the like, and may be formed in a wafer form. The photovoltaic power generation panel 110 is located in a field or an outer wall of a building or a roof that can receive sunlight well, and generates electric power using sunlight. At this time, the photovoltaic power generation panel 110 may be formed of building-integrated photovoltaic (BIPV) power generator that is integrally formed with the building.

The first converter 120 converts and outputs the power being applied from the photovoltaic power generation panel 110.

More specifically, the first converter 120 converts and outputs the power being generated in the photovoltaic power generation panel 110 so that it is suitable for storing or transmitting to a connected load or power system. In converting a power, the first converter 120 may output the power by boosting or reducing the received voltage. At this time, the first converter 120 may be a converter, may be formed as a DC-DC converter, and may convert a DC voltage into another DC voltage and output it.

The first converter 120 may control the photovoltaic power generation panel by using the maximum power point tracking. Maximum power point tracking (MPPT) can be used to increase the efficiency of photovoltaic power generation. In photovoltaic power generation, the maximum power may be a power at about 80% of the maximum voltage, not the maximum voltage, depending on the relationship between current and voltage and the relationship between voltage and power. Since this maximum power point continues to change according to the magnitude of the current generated by the photovoltaic power generation panel 110, a point that can generate the maximum power point must be continuously searched for. That is, in order to follow the maximum power, not the maximum voltage, the magnitudes of the voltage and the current may be varied so as to become the maximum power. That is, the voltage may be decreased and the current may be increased, or the voltage may be increased and the current may be decreased in a direction in which the power is increased. The first converter 120 may control the photovoltaic power generation panel 110 to generate maximum power from the photovoltaic power generation panel 110 using the maximum power point tracking. The first converter 120 may include one or more switches, and may follow the maximum power point by controlling the time ratio of the switches. Here, the time ratio is a ratio of a time when a current flows to a time when no current flows, and in the case of a switch, it means a ratio of turning on, and the time ratio is also referred to as a duty ratio or a duty cycle.

The second converter 130 receives, via a first input/output terminal, the power outputted by the first converter, converting same, and outputting same via a second input/output terminal, or receiving power from the second input/output terminal, converting same, and outputting same via the first input/output terminal. Here, the first input/output terminal and the second input/output terminal refer to two input/output terminals of the second converter 130, and are formed so that power can be inputted and outputted in both directions. The second converter 130 may transmit and receive power to and from the first converter 120 or the third converter 140 through the first input/output terminal, and the power may be transmitted and received to and from the load 220 or the power system 210 through the second input/output terminal.

More specifically, the second converter 130 transmits the power generated by the photovoltaic power generation panel 110 and converted by the second converter 130 to the load 220, or it is transmitted from the power system 210. Here, the load 220 is a power receiving device connected to use power generated through photovoltaic power generation, and may be devices that consume power inside a building when a photovoltaic power generation system is implemented in a building. The power system 210 refers to a power network represented by a grid as a commercial power system. The load 220 may sell power by transmitting excessive power than the power required to the power system 210. The second converter 130 may be an inverter. Here, the inverter is a device that converts DC power into AC power. Or, the second converter 130 may be a DC-AC converter or an AC-DC converter.

In addition, the second converter 130 may receive a power of the energy storage device 150 being charged through the third converter 140 and transmit to the load 220 or the power system 210 by using the power generated by the photovoltaic power generation panel 110 and converted by the second converter 130. That is, in transmitting power to the load 220 or the power system 210, the second converter 130 directly receives power from the first converter 120, or may receive the power stored in the second converter 130.

The second converter 130 may receive power from the power system 210 as well as transmit power generated through photovoltaic power generation to the load 220 or the power system 210. In order to charge the energy storage device 150 in an environment in which photovoltaic power generation is difficult or when external power is cheap, power may be received from the power system 210 rather than photovoltaic power generation.

The second converter 130 receives a power from the first converter 120 that outputs DC power, converts it into an AC power being used in the load 220 or the power system 210, and outputs it. That is, it converts a DC power into an AC power. Since it converts DC to AC, it may also be referred to as an inverter. In addition, in receiving power from the power system 210 and outputting power to the third converter 140, the second converter 130 receives an AC power from the power system 210, converts it into a DC power being used in the third converter 140, and outputs it. That is, the second converter 130 may be referred to as a bidirectional inverter, bidirectional converter, or bidirectional AC-DC converter that converts AC to DC and DC to AC, in which input and output can be changed in both directions.

The third converter 140 receives power from the first converter 120 or the second converter 130 to charge the energy storage device 150, or transmits the power charged in the energy storage device 150 to the second converter 130.

More specifically, the third converter 140 receives the power generated by the photovoltaic power generation panel 110 and outputted from the first converter 120 to charge the energy storage device 150. Here, the energy storage device 150 may be a battery module. That is, it is a converter that serves to store the power generated through photovoltaic power generation into a battery. The third converter 140 converts the power outputted from the first converter 120 into a power for charging the energy storage device 150. The third output conversion unit 140 may be a converter. Since the power outputted from the first converter 120 is a DC power, and the power to charge the energy storage device 150 is also a DC power, the third converter 140 may be a DC-DC converter. In addition, in general, since the magnitude of the voltage used by the battery module is smaller than the magnitude of the voltage outputted from the first converter 120, the third converter 140 may reduce the received voltage to output it.

In charging the energy storage device 150, the third converter 140 charges the energy storage device 150 by receiving power from the first converter 120 that converts and outputs a photovoltaic generation power, as well as the second converter 130 that converts and outputs a power received from the power system 210. For example, the energy storage device 150 is charged by receiving power from the first converter 120 when power is generated from photovoltaic power generation, and receiving power from the second converter 130 when power is not generated through photovoltaic power generation, or when the power system 210 is inexpensive.

The third converter 140 not only charges the energy storage device 150 by receiving power from the first converter 120 or the second converter 130, but also may transmit a power to the second converter 130 in order to transmit power charged in the energy storage device 150 to the load 220. The power transmitted to the second converter 130 is converted to an AC in the second converter 130 and transmitted to the load 220 or the power system 210.

The first converter 120, the second converter 130, and the third converter 140 may be connected to an energy storage device. Here, the energy storage device may be a DC-Link capacitor. DC-Link capacitors are also called smoothing capacitors. It is connected between each converter and serves as a buffer to transfer power between the converters. The corresponding point is called the DC-Link end.

The active power filter 160 reduces the ripple of the second converter 130.

More specifically, the active power filter 160 reduces the ripple generated at the output of the second converter 130. Here, the ripple is an AC component generated within the DC component, and may mean a periodic deviation from the average of voltage values. The active power filter 160 is an APF (Active Power Filter), and is a filter that tracks a harmonic component of an AC input terminal to remove a harmonic component of an AC output or removes an AC component included in a DC component.

The second converter 130 for connecting the internal power and external power of the photovoltaic power generation system may generate a lot of ripples by the power of both ends. In particular, the active power filter 160 may reduce ripples generated when the second converter 130 receives power from the power system 210. A lot of ripples may occur in the process of receiving power from the power system 210 and transmitting it to the third converter 140, that is, in the process of converting AC to DC. Since the output of the second converter 130 is VLink applied across the ends of the DC-Link capacitor, it can be said that the active power filter 160 reduces the ripples of VLink.

At this time, the active power filter transmits and receives power (energy) to and from the second converter 130 and removes the AC component of the power being outputted from the second converter 130, thereby possibly reducing the ripples of the second converter 130. An AC component may be included in the DC power being outputted from the second converter 130, and the active power filter 160 serves to remove the AC component included in the converted DC component. Active power filter 160 receives or transmits a voltage corresponding to a ripple corresponding to noise in the power being outputted from the second converter 130, thereby exchanging power with the second converter 130 to reduce ripples, but in the case of an abnormal situation in which the magnitude of the received voltage exceeds the threshold, ripples cannot be reduced, so the operation of the second converter 130 or the inputting of power must be stopped. To solve this, the power stored by the active power filter 160 is transmitted to the first converter 120. The active power filter 160 may be said that it stores energy, or it may be expressed that it reduces ripples by transmitting and receiving energy to and from the second converter 130.

The active power filter 160 includes an energy storage device for storing power. The active power filter 160 includes an energy storage element for storing received power in order to transmit and receive power to and from the second converter 130. The energy storage device included in the active power filter 160 may be a capacitor. The capacitor may be referred to as an APF capacitor.

When the voltage of the energy storage device is equal to or greater than the threshold, at least a portion of the power (energy) stored in the energy storage device may be transmitted to the first converter 120. When the voltage that the energy storage device of the active power filter 160 can store exceeds the threshold, since the energy storage device can no longer store the voltage, the active power filter 160 is unable to reduce the ripples of the second converter 130. When the ripples cannot be reduced, since the power becomes unstable, the operation of the second converter 130 may have to be stopped. Accordingly, at this time, at least a portion of the power stored in the energy storage device may be transmitted to the first converter 120 to allow the active power filter 160 to operate normally. When transmitting power from the energy storage device to the first converter 120, power corresponding to a threshold value or more may be transmitted, or the corresponding power may be transmitted such that the voltage of the energy storage device 161 becomes lower than the threshold value by a margin voltage. Here, the threshold may be a limit voltage of the energy storage device. Or, it may be a voltage obtained by applying a margin voltage to the limit voltage, or may be set by a user. The active power filter 160 may also be expressed that at least a portion of energy stored in the energy storage device is transmitted to the first converter 120.

In order to transmit the power of the active power filter 160 to the first converter 120, a transmission line for transmitting power may be formed. The corresponding transmission line is a power transmission line for transmitting power and may be formed of a power cable. When the voltage of the energy storage element of the active power filter 160 is equal to or greater than the threshold value, a switch may be formed in the transmission line in order to transmit at least a portion of the power stored in the energy storage device to the first converter 120. The switch may be turned on when the voltage of the energy storage device is equal to or greater than the threshold value to transmit power of the active power filter 160 to the first converter 120. When the voltage of the energy storage device is less than the threshold value, OFF state is maintained so that the power of the active power filter 160 may not be transmitted to the first converter 120. The photovoltaic power generation system 100 may further include a control unit (not shown) capable of controlling the switch.

Power transmitted from the active power filter 160 to the first converter 120 may charge the energy storage device 150 through the first converter 120 and the third converter 140. By regenerating the power of the active power filter 160 to the first converter 120, it is possible to stably operate the active power filter, and at the same time, the corresponding power can be used efficiently. The power transmitted to the first converter 120 may be transmitted to the third converter 140 through the first converter 120 to be used to charge the energy storage device 150.

Figure 2:
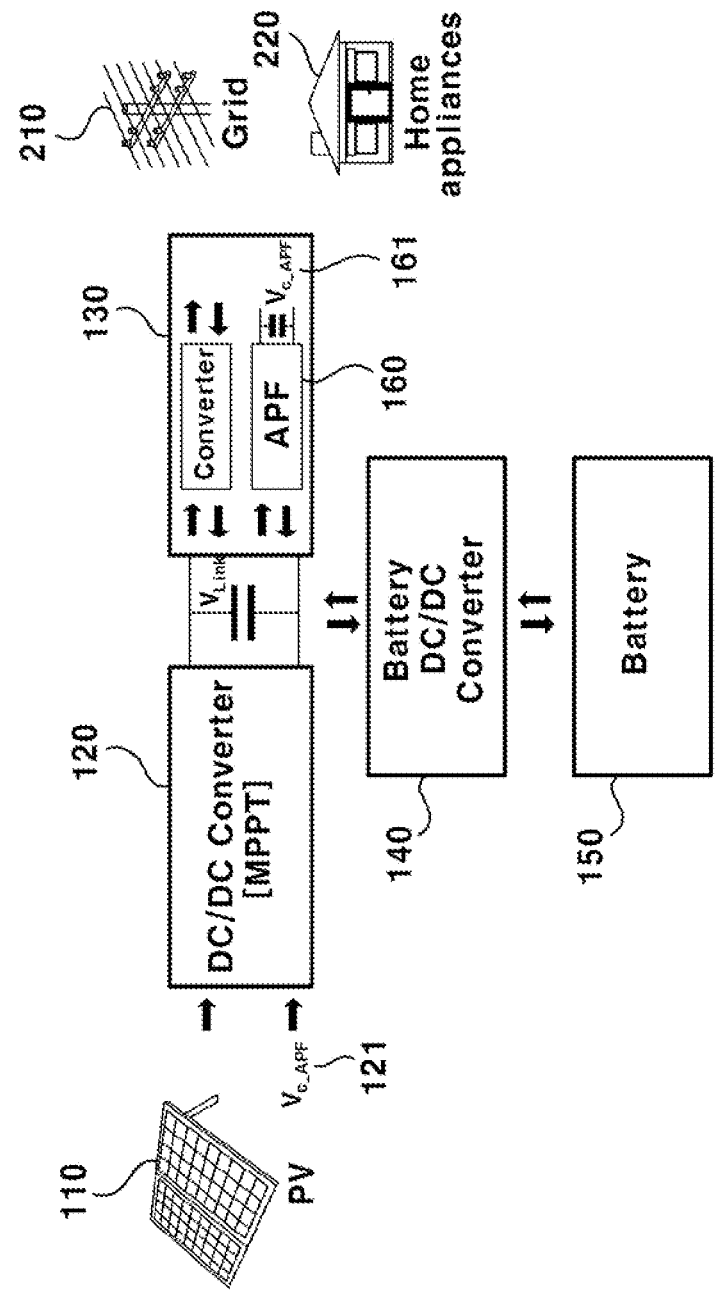
FIG. 2 is a view for explaining the operation of a photovoltaic power generation system according to an embodiment of the present invention.

FIG. 2 is an embodiment of a photovoltaic power generation system according to an embodiment of the present invention, the photovoltaic power generation system may comprise: a first converter 120, which is a DC-DC converter that receives power from a PV 110, which is a photovoltaic power generation panel with a DC-Link capacitor at the center thereof; a second converter 130 that is a battery DC-DC converter for charging the battery 150 or receiving power charged in the battery; a second converter 130 that is a bidirectional AC-DC converter for transmitting power generated through photovoltaic power generation to a load 220 such as a device at home or a grid-in power system 210 or receives power from the power system 210, and may include an active power filter 160 included in the second converter 130 to reduce the ripples of the second converter 130 and an energy storage device 161.

When the voltage of the energy storage device 161 included in the active power filter 160 for reducing the ripple of the second converter 130 is equal to or greater than the threshold value, by transmitting the power of the energy storage device 161 to an input 121 of the first converter 120, it is possible to prevent the active power filter 160 from not being operated because the energy storage device 161 can no longer store power. In addition, the efficiency may be increased by regenerating power by transmitting the power of the energy storage device 161 to the input 121 of the first converter 120.

Figure 3:
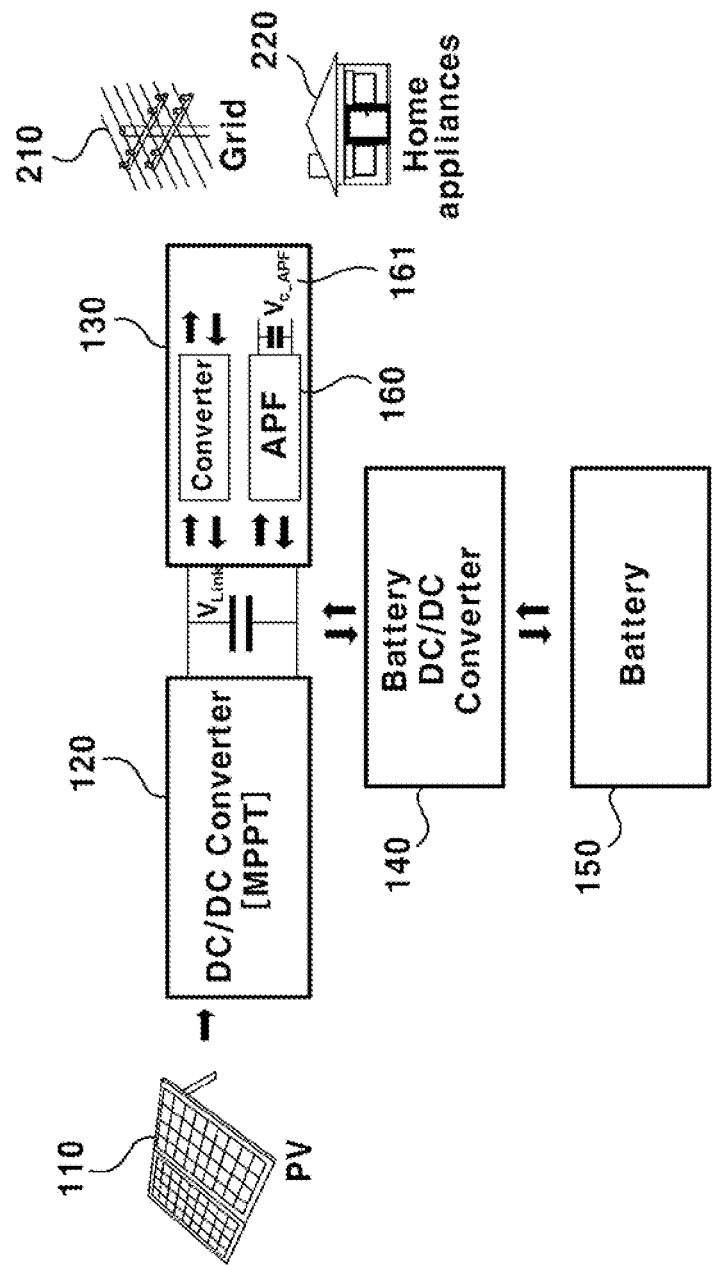
FIG. 3 illustrates a comparative example with a photovoltaic power generation system according to an embodiment of the present invention.

Unlike this, in the comparative example of FIG. 3, since there is no configuration for transmitting the power of the energy storage device 161 of the active power filter 160 to the first converter 120, when the voltage of the energy storage device 161 included in the active power filter 160 for reducing the ripple of the second converter 130 is equal to or greater than the threshold value, the active power filter 160 may stop the operation since the ripple of the second converter 130 cannot be reduced, and due to this, the second converter 130 may become unstable and stop the operation.

Figure 4:
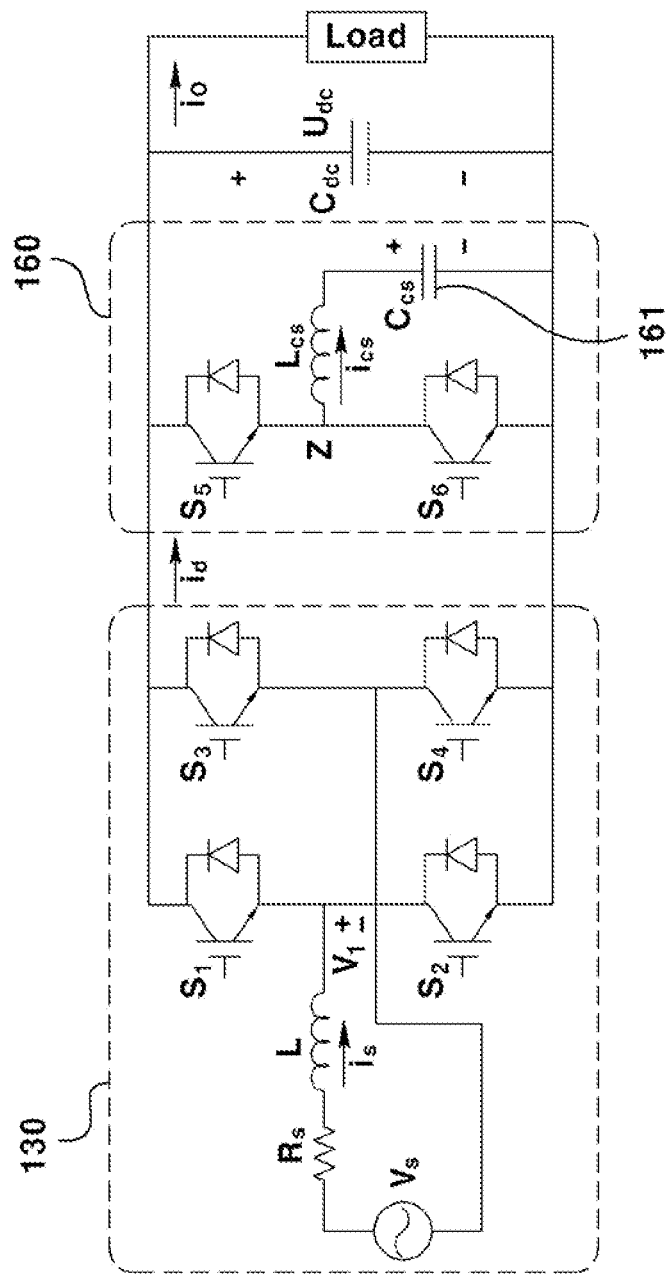
FIG. 4 illustrates an active power filter formed in an AC-DC converter.

FIG. 4 illustrates an active power filter 160 being formed in an AC-DC converter, and the operation of the active power filter 160 will be described with reference to FIG. 4 for a case where the second converter 130 performs the operation of converting an AC to a DC.

When the output voltage of the AC-DC converter increases above a certain level, power is transferred to the active power filter, thereby transferring the power of Cdc in a direction toward Ccs, and when it falls below a certain level, it performs operation in which the power of Ccs is discharged in a direction toward Cdc. Through this, it has a ripple voltage that fluctuates only within a certain range. If the electrolytic capacitor is reduced to extend the life of the AC-DC converter, the capacity of Cdc will be greatly reduced and the ripple voltage will be increased, to solve this problem a large number of film capacitors may be added or a circuit such as an active power filter may be used to reduce the ripples. However, the active power filter may become unstable in an abnormal situation, that is, when the value of VCcs continues to increase due to a large amount of power coming into Ccs. The photovoltaic power generation system according to an embodiment of the present invention transmits the power of Ccs of FIG. 4 to the first converter 120 so that the active power filter operates normally even in an abnormal situation, thereby stably operating the system.

Figure 5:
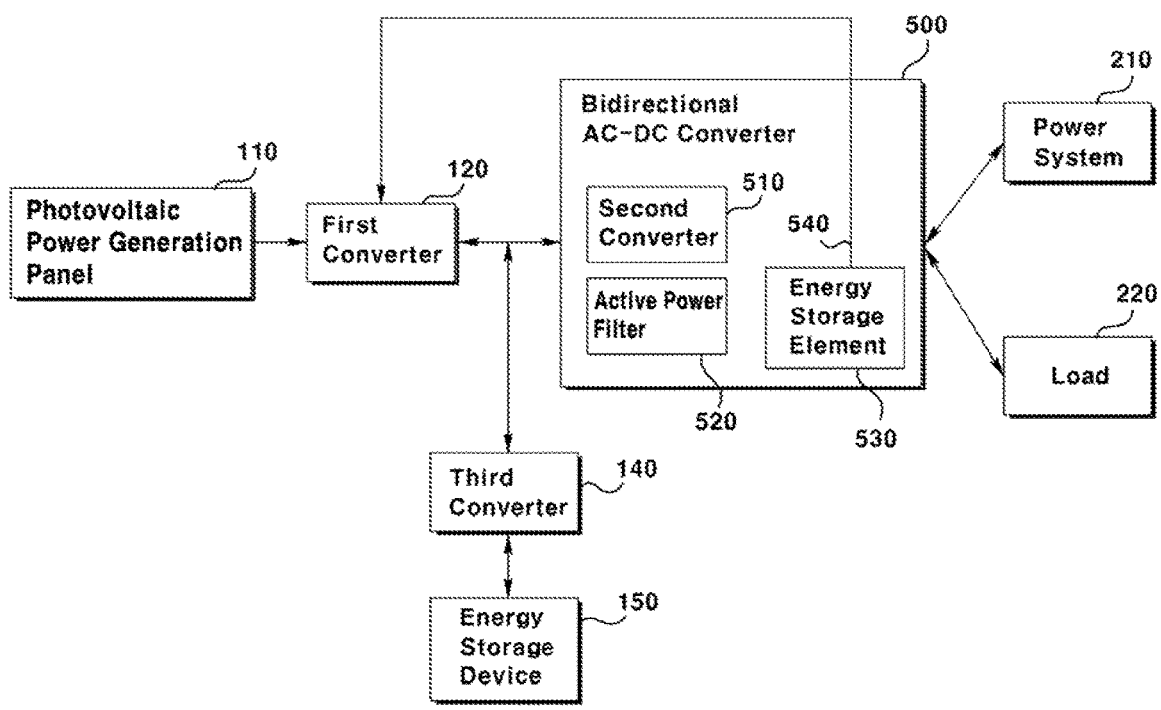
FIG. 5 is a block diagram of a bidirectional power converter according to an embodiment of the present invention.

FIG. 5 is a block diagram of a bidirectional power converter according to an embodiment of the present invention. The description of each configuration of FIG. 5 corresponds to the description of the photovoltaic power generation system 100 of FIGS. 1 to 4, and thus the overlapping description will be omitted.

A bidirectional power conversion device 500 according to an embodiment of the present invention comprises: a second converter 510; an active power filter 520; an energy storage element 530; and a transmission line 540 being connected from the energy storage element 530 to the first converter 120.

The second converter 510 receives power, via a first input/output terminal, from the first converter 120 or the third converter 140, converts same, and outputs same via a second input/output terminal, or receives power from the second input/output terminal, converts same, and outputs same via the first input/output terminal. Here, a second input/output terminal may be connected to the load 220 or the power system 210 to transmit power to the load 220 or the power system 210 or to receive power from the power system 210. It converts AC to DC or DC to AC in both directions, so it can be a bi-directional inverter or a bi-directional AC-DC converter.

The active power filter 520 reduces the ripples generated when the second converter 510 receives power from the second input/output terminal, that is, the power system 210. The ripples being generated in the output of the second converter while power is being exchanged with the second converter 510 are reduced.

The energy storage element 530 stores the power of the active power filter 520. The energy storage element 530 stores the power that the active power filter 520 receives from the second converter 510.

The transmission line 540 transmits at least a portion of the power (energy) stored in the energy storage element 530 to the first converter 120 when the voltage of the energy storage element 530 is equal to or greater than the threshold value. By regenerating the power stored in the energy storage element 530 through the first converter 120, it is possible to stably operate the second converter 510.

Meanwhile, the embodiments of the present invention can be implemented as computer-readable codes on a computer-readable recording medium. The computer-readable recording medium includes all types of recording devices in which data readable by a computer system is stored.

As examples of computer-readable recording media there are ROM, RANI, CD-ROM, magnetic tape, floppy disk, and optical data storage devices, and in addition, they are distributed across networked computer systems in a distributed manner in which computer-readable code can be stored and executed. And functional programs, codes, and code segments for implementing the present invention can be easily inferred by programmers in the technical field to which the present invention belongs.

As described above, in the present invention, specific matters such as specific components, and the like; and limited embodiments and drawings have been described, but these are only provided to help a more general understanding of the present invention, and the present invention is not limited to the above embodiments, and various modifications and variations are possible from these descriptions by those of ordinary skill in the art to which the present invention belongs.

Therefore, the spirit of the present invention should not be limited to the described embodiments, and not only the claims to be described later, but also all those with equivalent or equivalent modifications to the claims will be said to belong to the scope of the spirit of the present invention.

The invention claimed is:

1. A photovoltaic power generation system comprising:
   a first converter for converting and outputting power applied from a photovoltaic power generation panel;
   a second converter for receiving, via a first input/output terminal, the power outputted from the first converter, converting the power received, and outputting the power converted via a second input/output terminal, or receiving power from the second input/output terminal, converting the power received, and outputting the power converted via the first input/output terminal;
   a third converter for receiving power from the first converter or the second converter and charging an energy storage device, or transmitting power charged in the energy storage device to the second converter; and
   an active power filter for reducing ripple in the second converter,
   wherein power stored in the active power filter is transmitted to the first converter.

2. The photovoltaic power generation system according to claim 1, wherein the active power filter comprises an energy storage element for storing power, and
   wherein when a voltage of the energy storage element is equal to or greater than a threshold value, at least a portion of the power stored in the energy storage element is transmitted to the first converter.

3. The photovoltaic power generation system according to claim 2, wherein the energy storage element comprises a capacitor.

4. The photovoltaic power generation system according to claim 1, wherein the active power filter reduces the ripple generated when the second converter receives power from the second input/output terminal.

5. The photovoltaic power generation system according to claim 1, wherein the active power filter reduces the ripple of the second converter by transmitting and receiving power to and from the second converter and removing AC component of power being outputted from the second converter.

6. The photovoltaic power generation system according to claim 1, comprising:
   a transmission line for transmitting power from the active power filter to the first converter.

7. The photovoltaic power generation system according to claim 1, wherein the power transmitted from the active power filter to the first converter charges the energy storage device through the first converter and the third converter.

8. The photovoltaic power generation system according to claim 1, wherein the first converter controls the photovoltaic power generation panel by using maximum power point tracking.

9. The photovoltaic power generation system according to claim 1, wherein the first converter and the third converter are DC-DC converter, and
   wherein the second converter is a bidirectional inverter or a bidirectional AC-DC converter.

10. The photovoltaic power generation system according to claim 1, comprising:
    an energy storage element connecting the first converter, the second converter, and the third converter.

11. The photovoltaic power generation system according to claim 10, wherein the energy storage element is DC-Link capacitor.

12. The photovoltaic power generation system according to claim 1, wherein the active power filter comprises two switching elements serial-connected and an inductor connected a node between the two switching elements.

13. The photovoltaic power generation system according to claim 1, wherein the active power filter comprises energy storage element serial-connected to the inductor.

14. The photovoltaic power generation system according to claim 1, wherein the second converter converts DC power received from the first converter to AC power.

15. The photovoltaic power generation system according to claim 1, wherein the second converter outputs power to a road or a grid, via the second input/output terminal, or receives power from the grid.

16. A bi-directional power converting device comprising:
   a second converter for receiving, via a first input/output terminal, from a first converter or a third converter, converting the power received, and outputting the power converted to a second input/output terminal, or receiving power from the second input/output terminal, converting the power received, and outputting the power converted to the first input/output terminal;
   an active power filter for reducing ripple generated when the second converter receives power from the second input/output terminal; and
   an energy storage element for storing power of the active power filter.

17. The bi-directional power converting device according to claim 16, wherein when a voltage of the energy storage element is equal to or greater than a threshold value, at least a portion of the power stored in the energy storage element is transmitted to the first converter.

18. The bi-directional power converting device according to claim 16, wherein the active power filter reduces the ripple generated when the second converter receives power from the second input/output terminal.

19. The bi-directional power converting device according to claim 16, wherein the active power filter reduces the ripple of the second converter by transmitting and receiving power to and from the second converter and removing AC component of power being outputted from the second converter.

20. The bi-directional power converting device according to claim 16, comprising:
   a transmission line for transmitting at least a portion of the power stored in the energy storage element to the first converter when a voltage of the energy storage element is equal to or greater than a threshold value.

* * * * *